Figure 1:
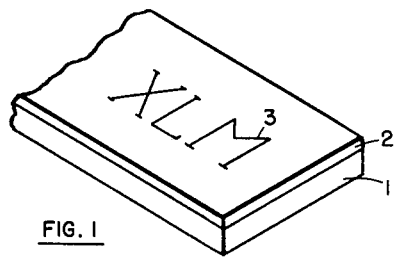

July 11, 1961  S. W. BROWN  2,992,292
INDICIA-BEARING SILICONE RUBBER INSULATED CABLE
Filed March 28, 1957  2 Sheets-Sheet 1

INVENTOR.
SANFORD W. BROWN
BY
William N. Patrick
AGENT

United States Patent Office 2,992,292
Patented July 11, 1961

2,992,292
INDICIA-BEARING SILICONE RUBBER INSULATED CABLE
Sanford W. Brown, Norwalk, Calif., assignor to North American Aviation, Inc.
Filed Mar. 28, 1957, Ser. No. 649,226
12 Claims. (Cl. 174—112)

This invention relates to indicia-bearing silicone rubber article of manufacture, and to a method for its preparation. More particularly, this invention relates to silicone rubber composition containing an indicia for identification purposes.

Identification means have long been used with insulated cable for the purpose of indicating its intended use, its source of manufacture, etc. One method of identification employed heretofore has been the attachment of tags or labels to spools or reels of cable. Another method has been to weave a multi-colored braid on the cable. Still another method consisted of applying a penetrating ink to the surface of the insulation to form various figures or characters. None of these methods, however, are suitable for identifying insulation which is to be exposed to temperatures of 500 degrees F. and higher. The reason for this is that insulation which will stand such high temperatures is of a composition which does not permit penetration by ink or other soluable pigments or dies that would penetrate ordinary insulation material. Polytetrafluoroethylene (Teflon) and silicone rubber are materials used for high temperature insulation which are not penetrated by ink or dies. It is difficult, therefore, to mark such insulation for identification purposes.

An object of this invention, therefore, is to provide silicone rubber composition or article having an indicia incorporated therein so as to provide a marking which cannot be readily rubbed off.

Another object is to provide electrical insulator bearing an identifying indicia which cannot be removed without the removal of a portion of the silicone rubber.

A further object of this invention is to provide an electrical conductor having a silicone rubber insulation bearing an indicia which cannot be obliterated without removing a portion of the silicone rubber.

Still other objects of this invention will become apparent from the discussion which follows.

The above and other objects of this invention are provided by a composition comprising a silicone rubber article having an indicia marked with a pigment on said silicone rubber and a silicone resin coating covering said indicia-marked silicone rubber.

The silicone rubber article may be silicone rubber tubing which is used as electrical cable insulation. Indicia is printed on this silicone rubber tubing with a high melting point pigment which does not penetrate into the insulating material but merely remains on its surface. This is then covered with a silicone resin coating to provide an electrical cable insulation containing identification markings or indicia therein, which cannot be removed without removing part of the silicone tubing.

The pigment, which is used in making the identifying markings on the silicone rubber, is selected from the class consisting of high melting metal oxides and carbon black. Non-limiting examples of such pigments are oxides of chromium, ferric oxide, lead oxide, cadmium oxide, cuprous oxide, carbon black, etc., and mixtures of two or more of these compounds. The markings may be applied to the silicone rubber in any manner. One method is to print the markings through a tape containing the pigment on its surface. An example of a tape used for this purpose is one in which the pigment is held by an adhesive to a polyvinyl acetate backing sheet. The tape is heated to soften the binder which holds the pigment to the backing and while at this elevated temperature, the ribbon is brought into contact with and pressed against the surface of the silicone rubber so as to make contact between the silicone rubber and the pigment-bearing side of the tape. The pressure is applied to the opposite side of the tape by means of a stamp or die having raised in relief thereon, the characters with which the rubber is to be marked. The pigment is thus transferred from the tape to the surface of the silicone rubber to provide an indicia corresponding to the characters of the die. This pigment merely adheres to the surface of the silicone rubber. It does not penetrate the surface nor impregnate the silicone rubber material.

One embodiment of this invention is to employ a pigment composed of 95 weight percent chromium dioxide and 5 weight percent carbon black. Another embodiment is the use of 95 weight percent chromium monoxide and 5 weight percent carbon black. Ferric oxide also forms a suitable pigment.

The silicone rubber to be marked may be in the form of rubber sheeting, rubber tubing or sleeving, or it may be any silicone rubber article of manufacture. It may be made of any silicone rubber composition as for example, methyl silicone rubber. The preparation of various silicone rubbers may be found in a text entitled "The Chemistry of the Silicones," second edition by Eugene G. Rochow, prepared by John Wiley and Sons, Inc., New York, which also contains references to patent literature.

The silicone rubber sheeting or tubing may be reinforced as for example, with glass fibre or cloth. The manufacture of such reinforced silicone rubber is well known in the art. Glass cloth, for example, is impregnated with dimethylsiloxane gum. The gum is in the form of a paste in a xylene solution containing 35 weight percent solids and having from 0.1 to 6 weight percent benzoyl peroxide, based on the weight of the rubber, as a curing catalyst. It may also contain from 40 to about 120 weight percent of a filler based on the weight of the silicone gum. As a filler, there may be used various metal and other oxides such as silica, titanium dioxide, etc. After impregnation, the reinforced silicone gum article is subjected to a temperature of from about 240° F. to about 500° F. for a time sufficient to cure the rubber. This usually takes about five or more minutes.

The silicone resin used to coat the indicia-containing silicone rubber may be any monovalent hydrocarbon-substituted polysiloxane resin composition. These polysiloxane resins have about 1 to about 1.8 organic radicals per silicon atom. Non-limiting examples of organic radicals, which may be attached to the silicon atoms by carbon-to-silicon bonds, are methyl, ethyl, propyl, butyl, cyclohexyl, phenyl, xylyl, tolyl, benzyl, naphthyl, etc.

The solvents in which the silicone resins are dissolved may be hydrocarbon solvents, halogenated hydrocarbons or ethers. Examples of such solvents are toluene, xylene, naptha, methylenechloride, tetrachlorethylene and ethyl ether.

Conventional organo siloxane resin curing or setting catalysts may be employed with the coating resins. Examples of such catalysts are metal salts of carboxylic acids such as lead-2-ethylhexoate, zinc-2-ethylhexoate, lead-napthenates, etc.

The various types of silicone resin which may be used are described in Rochow's "Chemistry of the Silicones" mentioned above. The resin may be a copolymer of two or more different hydrocarbon silicone resins as, for example, a methyl and phenyl silicone resin in which the ratio of hydrocarbon groups-to-silicon atoms is from about 1 to about 1.8 and in which from about 10 to about 30% of the number of hydrocarbon groups are phenyl groups. The resin may also contain copolymerized therein siloxanes having hydroxyester groups attached to the silicone by carbon-silicon bonds. Examples of such hydroxyester siloxane units in the resin, are those having the formula

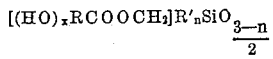

in which R is a polyvalent hydrocarbon radical, R' is a monovalent hydrocarbon radical, $n$ has a value of from 1 to 2 inclusive and x has a value of at least 1. Such siloxanes are prepared by the reaction of a metal salt of a hydroxy organic acid with a halomethyl siloxane having the general formula

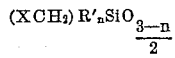

in which X is a halogen such as chlorine, bromine, etc., and R' is the same as defined above. The reaction is carried out in a solvent such as dimethylformamide. An example of such a hydroxy containing siloxane is

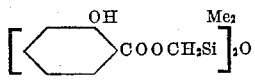

having a melting point of 38° C.

One embodiment of this invention is the use of a resin in which 75% of the groups attached to the silicon atoms are methyl groups, 24% are phenyl grousp and 1% are methylene orthohydroxy benzoate groups having the formula

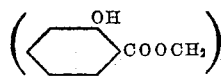

The resin is usually contained in a chlorinated hydrocarbon and/or naptha solvents so as to make up a solution containing 35 weight percent solids.

An embodiment of this invention is to apply a coating of resin solution to the silicone rubber prior to marking it with the pigment; hence an embodiment of this invention is a composition comprising a silicone rubber article having a coating of silicone resin thereon, an indicia marked with a pigment on said resin-coated silicone rubber, and a coating of silicone resin covering said pigment-marked and resin-coated silicone rubber article. The silicone rubber may be glass fiber reinforced silicone rubber tubing of a kind used for insulation purposes on electrical conductors.

To aid in the description of the indicia-bearing articles of this invention, reference can be made to the accompanying figures.

Figure 2:
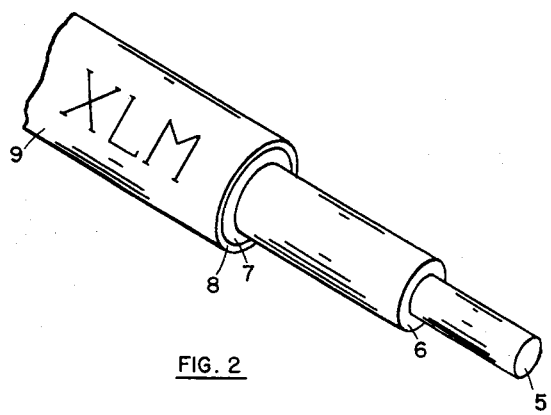
Figure 3:
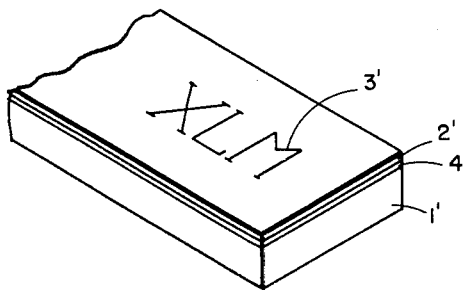
Figure 4:
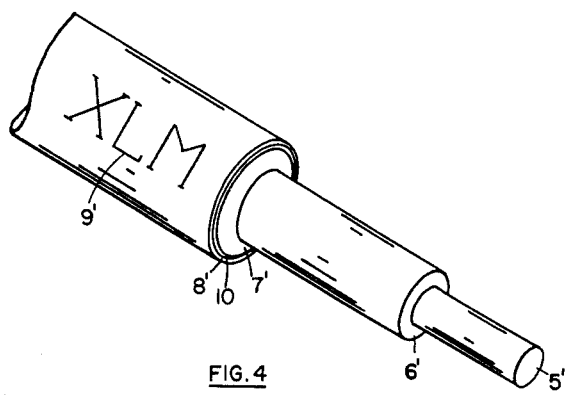

FIGS. 1 and 3 represent a composite sheet of silicone material having indicia embodied therein. FIGS. 2 and 4 represent insulated conductors having an outer covering of a silicone rubber material and containing identifying indicia therein. The dimensions of the articles shown in the figures are exaggerated to more clearly illustrate the component parts.

In FIG. 1, silicone rubber sheet 1 is marked with an indicia 3. A silicone resin coating, 2, covers the indicia bearing-silicone rubber.

In FIG. 3, the silicone rubber sheet 1' is coated with a silicone resin 4 on which the indicia 3' is marked and this, in turn, is covered with a silicone resin 2'.

In FIG. 2, a metal electrical conductor 5 is covered with a high temperature insulation 6 which, in turn, is covered with an insulation having the composition of the article shown in FIG. 1, namely a glass reinforced silicone rubber tubing 7 marked with an indicia 9 and the marked tubing is covered with a resin coating 8.

Another electrical conductor is shown in FIG. 4 in which a metal conductor 5' is insulated with a high temperature insulation 6'. This is covered with a silicone rubber tubing 7' having a resin coating 10 on which is printed indicia 9' and the whole covered with a silicone resin coating 8'.

Figure 5:
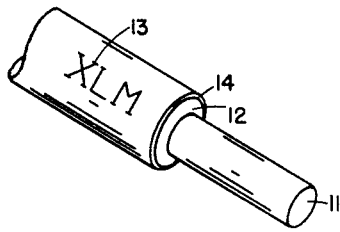

FIG. 5 shows an insulated electrical conductor in which a metal conductor 11 is insulated with silicone rubber 12. An indicia 13 is marked on the silicone rubber with a high melting point pigment. The silicone resin coating 14 covers the indicia 13 and is bonded to the silicone rubber insulation 12.

Figure 6:
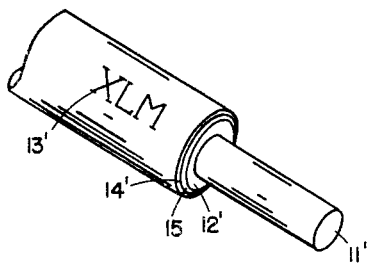

The conductor shown in FIG. 6 is similar to that shown in FIG. 5 with the exception that a coating of silicone resin 15 is bonded to the silicone rubber insulation 12' and the indicia 13' is marked with a high temperature melting pigment on this silicone resin coating. A second silicone resin coating 14' is applied over the indicia and bonded to the first silicone resin coating 15 covered with a silicone resin coating 8'.

The process of making the high temperature resistant indicia-bearing silicone rubber article comprises applying a high melting pigment to the surface of the silicone rubber article in a manner so as to form an indicia of identifying characters or figures thereon, coating said indicia-containing silicone rubber surface with a silicone resin and subjecting said resin-coated silicone rubber to heat at a temperature sufficient to cure said resin coating. This results in an article in which the resin coating is cured and firmly bonded to the silicone rubber and having an identifying indicia incorporated therein which cannot be removed without removing or destroying a portion of the surface of the article. As stated herein above, the pigment may be applied by marking out the letters or characters with a pencil composed of bonded pigment particles or by printing with a die through a tape surfaced with a high temperature resistant pigment.

The silicone rubber surface may be cleaned with a suitable solvent prior to the application of the pigment. Hydrocarbon and ketone solvents are useful for this purpose. Suitable solvents are benzene, acetone, methyl ethyl ketone, and a mixture of methyl ethyl ketone and toluene.

Another method of making indicia-bearing silicone rubber articles of this invention is to apply an initial coating of silicone resin to the surface of the silicone rubber prior to the application of the pigment. The resin is usually in the form of a solution in a hydrocarbon and/or chlorinated hydrocarbon solvent. It is necessary therefore, to allow the solvent to evaporate prior to the application of the pigment. The initial resin coating is preferably of minimum thickness. The depth of the initial resin coating can be kept to a minimum by applying a resin solution which has been reduced with solvent so that it contains a very low percentage of resin. An embodiment of this invention is to use a resin solid containing from about 1 to about 4 weight percent solid. The pigment is then applied to the dried initial coating of resin on the silicone rubber and then another coating of silicone resin is applied over the indicia and the first resin coat. The coated and indicia-bearing silicone rubber article is then subjected to heat at a temperature sufficient to cure the resin.

When the silicone rubber is in the form of rubber tubing, it provides an indicia-bearing composition which can be used for high temperature insulation purposes on electrical conductors. This silicone rubber tubing or sleeving may be pulled over an electrical conductor which may or may not be insulated with other high temperature insulation to form an indicia-bearing electrical conductor of the type shown in FIGS. 2 and 4. These conductors will withstand high temperature atmospheres and in addition, have an indicia thereon which is also unaffected by elevated temperatures and which cannot be obliterated without removing a portion of the silicone composition.

Another embodiment of this invention is a process in which a silicone resin coating is applied to a silicone rubber insulated electrical conductor, the resin coating is allowed to dry, a pigment is applied to the resin-coated silicone rubber to form an identifying indicia, a second coating of silicone resin is applied over the first resin coating and indicia pigment and the resin-coated conductor subjected to heat at a temperature sufficient to cure the resin coating. In like manner, an indicia-bearing electrical conductor may be prepared with the omission of the first resin coat.

The following examples are given to further illustrate the method of preparing the indicia-bearing articles in this invention.

*Example I*

A pigment composed of 95 weight percent chromium monoxide and 5 weight percent carbon black is applied to a sheet of solvent cleaned dimethyl silicone rubber so as to form an indicia thereon as illustrated in the figures. The pigment is applied by printing with dies having the desired characters thereon, through a tape containing the pigment on one face thereof. The pigment tape is composed of a polyvinyl acetate backing with a film of the pigment bonded to one surface thereof with a binder. The printing of the figures on the silicone rubber is accomplished by contacting the reverse side of the pigment tape with heated dies bearing the required figures, and pressing the tape against the rubber to be marked so that the face of the tape bearing the marking pigment comes in contact with the silicone rubber. The heated die, upon coming in contact with the reverse side of the tape, causes the binder which holds the pigment to the tape backing to soften, allowing the pigment to adhere to the surface of the silicone rubber. The marking is performed by printing with a Kingsley Stamping Machine. To the pigment-marked silicone rubber is then applied a coating of a solution of monovalent hydrocarbon-substituted polysiloxane resin having an average of 1.5 organic radicals per silicon atom in which the radicals are methyl and phenyl radicals in the ratio of 1-to-4 methyl-to-phenyl radicals. The solution employed is composed of resin dissolved in naptha solvent in the proportions of one part of resin-to-three parts of solvent. The solution contains in addition 0.1 weight percent, based on the resin, of zinc-2-ethylhexoate. The coated and indicia-containing silicone rubber sheet is then subjected to heat at a temperature of substantially 250° C. for a period of substantially 5 minutes. This brings about a curing of the resin coating and at the same time causes it to adhere firmly to the silicone rubber sheeting.

*Example II*

The process of Example I is repeated with the modification that a coating of resin is applied to the silicone rubber prior to the application of the marking pigment and the curing consists of heating at 25° C. for a period of substantially 2 hours.

*Example III*

To a glass cloth-reinforced silicone rubber sheet which has been cleaned with methyl ethyl ketone is applied a solution of silicone resin in a solvent composed of 50 weight percent trichloroethylene and 50 weight percent xylene. The resin contains an average of 1.4 organic groups per silicon atom bonded by carbon-to-silicon bonds. The groups consist of methyl radicals, phenyl radicals and radicals having the general formula $$HO(CH_2)_4COOCH_2-$$

in the ratio of 30:10:1. The solution contains 2 weight percent resin. The coating on the silicone rubber is allowed to dry in air at a temperature of substantially 20° C. This takes approximately 20 minutes. To this is then applied a pigment consisting of ferric oxide so as to form an indicia as shown in the figures. Over the indicia-containing coated silicone rubber is then applied a resin solution containing 20 mol percent monophenylsiloxane, 15 mol percent dimethylsiloxane, 20 mol percent monomethylsiloxane and 40 mol percent phenylmethylsiloxane. The resin is dissolved in a naptha solvent and contains 0.6 weight percent, based on the resin, of lead-2-ethylhexoate. The ratio of resin to solvent is 1-to-4. The resin solution is applied so as to form a coating 2–5 mils thick. The indicia containing silicone rubber sheet is then subjected to heat at a temperature of substantially 200° C. for a period of substantially 5 minutes. The finished product consists of an indicia-containing silicone rubber article having a cured and flexible resin coating which adheres firmly to the silicone rubber.

Similar results are obtained when the process of Example III is repeated with pigments consisting of lead oxide, chromium oxide, cuprous oxide, and mixtures of lead oxide and chromium oxide.

*Example IV*

Methyl silicone rubber tubing is cleaned with methyl ethyl ketone. To this rubber tubing is then applied an indicia by the process of Example I. The indicia-containing tubing is then coated with a resin solution containing substantially 25% solids. The resin contains 1.8 organic radicals per silicon atom attached to the silicon by means of carbon-to-silicon bonds. The organic radicals consist of methyl radicals, phenyl radicals and radicals having the general formula

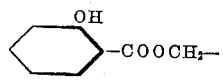

in the ratio of 50:10:1. The solvent consists of trichloroethylene, acetone and methyl ethyl ketone in equal proportions. The coating is applied by dipping the tubing in the resin solution. This provides a coating substantially 2 mils thick upon curing. The solution contains 0.2 weight percent, based on the resin, of zinc-2-ethylhexoate. The indicia-containing coated tubing is passed through a heating zone maintained at 125° C. at a rate so as to provide a residence time of substantially 10 minutes per unit length of tubing. This is found to be sufficient to cure the resin coating and provide an indicia-bearing silicone rubber tubing.

Similar results are obtained when the silicone resin employed in Example IV contains 1.0 organic radical per silicon atom attached to the silicon by carbon-to-silicon bonds.

*Example V*

To a glass fibre reinforced methyl silicone rubber tubing having an inside diameter of .25 inch and outside diameter of .27 inch is applied a 2% silicone resin solution in a solvent composed of one part naphtha and three parts methyl ethyl ketone. The resin consists of 30 mol percent monomethylsiloxane, 10 mol percent monophenylsiloxane, 10 mol percent phenylmethylsiloxane and 50 mol percent of dimethylsiloxane. The resin solution is applied by means of a brush and the solvent allowed to evaporate. To the resin-coated silicone rubber tubing is then applied a pigment consisting of 95 weight percent chromium monoxide and 5 weight percent carbon black in the manner described in Example I to form an indicia as shown in the figures. To the pigment-containing tubing is then applied a 25 weight percent resin solution in a naphtha solvent by means of spraying. The latter resin consists of 25 mol percent monovalent siloxane, 10 mol percent dimethylsiloxane, 35 mol percent phenylmethylsiloxane and 30 mol percent monomethylsiloxane. The solution contains 2 weight percent, based on the resin, of zinc-2-ethylhexoate. The tubing is subjected to heat at a temperature of substantially 125° C. for a period of substantially 20 minutes to provide a silicone rubber tubing bearing indicia which can not be removed without removing a portion of the surface of the tubing.

Results similar to that of Example V are obtained when the solids content of the resin solution which is applied prior to the application of the pigment is 1 weight percent. Likewise, good results are obtained when the solids content is 5 weight percent.

*Example VI*

Following the procedure of Example IV, a high melting point metal oxide pigment is applied to the surface of a silicone rubber insulated electrical conductor to form an identifying indicia thereon. A silicone resin coating is then applied over the indicia and bonded to the silicone rubber insulation. This forms an indicia-containing electrical conductor of the type shown in FIG. 5.

*Example VII*

Following the procedure of Example V, a silicone resin solution containing 2% resin in a methyl ethyl ketone solvent is applied to the surface of a methyl silicone rubber insulated electrical conductor. The solvent is allowed to evaporate leaving a thin film of resin coating on the silicone rubber. On this resin coated conductor is then applied a lead oxide pigment with the aid of a stamping machine so as to form identifying figures on the insulation. A second resin coating is then applied as described in Example V over the markings and the first resin coating. The coated electrical conductor is then subjected to a temperature of substantially 120° C. for a period of substantially 10 minutes to provide a silicone rubber insulated electrical conductor, bearing identifying indicia as illustrated in FIG. 6.

A rubber tubing prepared as in Example IV, was drawn over an electrical cable consisting of a metal conductor insulated with polytetrafluoroethylene (Teflon). This provides a high temperature resistant insulated electrical conductor bearing indicia for identification purposes which indicia cannot be removed by rubbing. Exposure of the conductor to temperatures of substantially 250° C. for approximately 100 hours had no effect on the coating or the condition of the identifying pigment marking. In like manner, the rubber sheeting described in Examples I and II withstands ordinary friction and also high temperatures so that the indicia or markings can only be removed by removing a portion of the resin and silicone rubber to a depth greater than the silicone resin coating over the pigment markings.

Although the invention has been described and illustrated in detail, it is to be clearly understood that the same is by way of illustration and example only and is not to be taken by way of limitation, the spirit and scope of this invention being limited only by the terms of the appended claims.

I claim:

1. An electrical cable insulation comprising silicone rubber tubing having a coating of silicone resin on said tubing, an indicia printed with a high melting non-penetrating pigment on said coated silicone rubber tubing, and a coating of silicone resin covering said indicia-containing resin-coated silicone rubber tubing, and wherein said pigment consists essentially of at least one substance selected from the class consisting of a high melting metal oxide and carbon black and wherein at least one component of said pigment is a high melting metal oxide, and wherein said resin coatings have been cured in a single operation whereby said pigment is enclosed within said cured resin.

2. An electrical cable comprising a conductor insulated with the insulation of claim 1.

3. A method of applying indicia to silicone rubber comprising applying to said silicone rubber a first coating of a silicone resin to form a coated base, applying a high melting point, non-penetrating pigment of a color contrasting with the color of said silicone rubber to said first coating to form an indicia thereon, and then applying a second coating of a silicone resin to said indicia-bearing silicone rubber and curing said coatings in a single operation thereby enclosing said pigment within said cured resins, and wherein said pigment consists essentially of at least one substance selected from the class consisting of a high melting metal oxide and carbon black and wherein at least one component of said pigment is a high melting metal oxide.

4. A method of applying indicia to silicone rubber comprising applying to said silicone rubber a first coating of a silicone resin in the form of a 2 percent solution of said resin in a hydrocarbon solvent, evaporating said solvent from said coating, applying a high melting, non-penetrating pigment to said coated silicone rubber to form an indicia thereon, and applying to said indicia-marked first silicone resin coating a second silicone resin solution in a hydrocarbon solvent containing 25 percent by weight of said resin and 2 weight percent lead 2-ethylhexoate based on the weight of said resin, and subjecting said indicia-containing silicone resin-coated rubber to a temperature sufficient to cure said resin coatings, whereby said pigment is enclosed within said cured resin coatings, and wherein said pigment consists essentially of at least one substance selected from the class consisting of a high melting metal oxide and carbon black and wherein at least one component of said pigment is a high melting metal oxide.

5. An article comprising a silicone rubber base having a first coating of a silicone resin thereon, an indicia marked with a high melting, non-penetrating pigment on said first coating, and a second silicone resin coating covering said first coating and said indicia, said pigment consisting essentially of at least one substance selected from the class consisting of a high melting metal oxide and carbon black, and wherein at least one component of said pigment is said high melting metal oxide, and wherein said first and said second silicone resin coatings are cured in a single operation whereby said pigment is enclosed within said cured resin.

6. The article of claim 5, wherein the indicia pigment is comprised substantially of 95 weight percent chromium oxide and 5 weight percent carbon black.

7. An article comprising a silicone rubber base, a first coating of a silicone resin on said base, an indicia marked with a high melting, non-penetrating pigment on said first coating, and a second silicone resin coating covering said first coating and said indicia, said pigment consisting essentially of at least one substance selected from the class consisting of (a) carbon black, and (b) high melting metal oxides selected from the class consisting of oxides of chromium, ferric oxide, lead oxide, cadmium oxide, and cuprous oxide, and wherein at least one component of said pigment is said high melting oxide, and wherein said first and said second silicone resin coatings are cured in a single operation whereby said pigment is enclosed within said cured resin.

8. An electrical cable insulation comprising silicone rubber tubing having a first coating of silicone resin on said tubing, an indicia printed with a high melting, non-penetrating pigment on said first coating, and a second coating of a silicone resin covering said indicia-imprinted first resin coating, and wherein said pigment consists essentially of at least one substance selected from the class consisting of (a) carbon black, and (b) high melting metal oxides selected from the class consisting of oxides of chromium, ferric oxide, lead oxide, cadmium oxide, and cuprous oxide, and wherein at least one component of said pigment is said high melting oxide, and wherein said first and said second silicone resin coatings are cured in a single operation whereby said pigment is enclosed within said cured resin.

9. An electrical cable comprising a conductor insulated with the insulation of claim 8.

10. A method of preparing an indicia-containing silicone rubber article comprising providing a silicone rubber base material, applying to said base material a first coating of a silicone resin to form a coated base, applying a high melting point, non-penetrating pigment of a color contrasting with the color of said base to said first coating to form an indicia thereon, subsequently applying a second coating of a silicone resin to said indicia-bearing coated base, and wherein said pigment consists essentially of at least one substance selected from the class consisting of a high melting metal oxide and carbon black, and wherein at least one component of said pigment is said high melting metal oxide, and subjecting said article to heat at a temperature sufficient to bring about curing of said resins whereby said pigment is enclosed within said cured resins.

11. A method of preparing an indicia-containing silicone rubber article comprising providing a silicone rubber base material, applying a first coating of a silicone resin to said base material to form a coated base, applying a high melting point, non-penetrating pigment of a color contrasting with the color of said base and said first coating to form an indicia thereon, applying a second coating of a silicone resin to said indicia-bearing coated base to form said article, wherein said pigment consists essentially of at least one substance selected from the class consisting of (a) carbon black, and (b) high melting metal oxides selected from the class consisting of oxides of chromium, ferric oxide, lead oxide, cadmium oxide, and cuprous oxide, and wherein at least one component of said pigment is said high melting oxide, and subjecting said article to heat at a temperature sufficient to cure said resins.

12. A method of providing an indicia-bearing silicone rubber article comprising providing a silicone rubber base material, applying to said base material a first coating of a silicone resin in the form of a 2 percent solution of said resin in a hydrocarbon solvent to form a coated base, evaporating said solvent from said coating, applying a high melting, non-penetrating pigment composed essentially of 95 weight percent chromium oxide and 5 weight percent carbon black to said coated base to form an indicia thereon, and applying a second coating to said indicia-bearing coated base, said second coating being composed essentially of a silicone resin solution in a hydrocarbon solvent containing 25 percent by weight of said silicone resin and 2 weight percent lead 2-ethylhexoate based on the weight of said resin, and subjecting said indicia-containing article to a temperature sufficient to cure said resins.

References Cited in the file of this patent

UNITED STATES PATENTS

| | | |
|---|---|---|
| 1,931,610 | Johnstone | Oct. 24, 1933 |
| 2,076,183 | Michaud | Apr. 6, 1937 |
| 2,186,555 | Phillips | Jan. 9, 1940 |
| 2,258,219 | Rochow | Oct. 7, 1941 |
| 2,392,388 | Joyce | Jan. 8, 1946 |
| 2,516,030 | Swiss | July 18, 1950 |
| 2,635,057 | Jordan | Apr. 14, 1953 |
| 2,694,650 | Herman et al. | Nov. 16, 1954 |
| 2,876,119 | Dithmar | Mar. 3, 1959 |
| 2,882,183 | Bond et al. | Apr. 14, 1959 |

FOREIGN PATENTS

| | | |
|---|---|---|
| 561,830 | Great Britain | June 6, 1944 |

OTHER REFERENCES

Electrical Manufacturing, June 1950, pages 100–103, 200 and 202.

American Ink Maker (Pub.), April 1948, pages 26–28, 55 and 57.

Printing Inks (Book), by Ellis, published 1940 by Reinhold Publishing Company, pages 40, 41, 135, 137, 145 and 174.